United States Patent [19]

Nilsson

[11] E Re. 29,205

[45] Reissued May 10, 1977

[54] PRESS FOR HYDROSTATIC EXTRUSION OF TUBES

[75] Inventor: Jan Nilsson, Robertsfors, Sweden

[73] Assignee: ASEA Aktiebolag, Vasteras, Sweden

[22] Filed: Dec. 29, 1975

[21] Appl. No.: 644,901

Related U.S. Patent Documents

Reissue of:

[64] Patent No.: 3,841,128
Issued: Oct. 15, 1974
Appl. No.: 367,106
Filed: June 5, 1973

[52] U.S. Cl. ..... 72/60; 72/265

[51] Int. Cl.[2] ..... B21C 25/04

[58] Field of Search ..... 72/60, 264, 265

[56] References Cited

UNITED STATES PATENTS

| | | | |
|---|---|---|---|
| 3,451,241 | 6/1969 | Fuchs, Jr. | 72/60 |
| 3,722,245 | 3/1973 | Yamamoto et al. | 72/60 |
| 3,751,958 | 8/1973 | Nilsson et al. | 72/60 |

FOREIGN PATENTS OR APPLICATIONS

| | | | |
|---|---|---|---|
| 1,234,784 | 6/1971 | United Kingdom | 72/60 |

OTHER PUBLICATIONS

*Machinery*, Sept. 1968, p. 173.

*Primary Examiner*—Othell M. Simpson
*Assistant Examiner*—Z. R. Bilinsky
*Attorney, Agent, or Firm*—Watson, Cole, Grindle & Watson

[57] ABSTRACT

A press for hydrostatic extrusion of tubes includes a high pressure cylinder axially displaceable in a press stand with a die insertable into the cylinder and a pressure generating punch insertable into the cylinder to generate the pressure for extrusion. A mandrel is carried by a rod which passes through the pressure generating punch. Seals are provided between the mandrel and the pressure generating punch and between the pressure generating punch and the pressure cylinder. These seals are so located that during the actual extrusion they are arranged in the same transverse plane.

4 Claims, 5 Drawing Figures

PRESS FOR HYDROSTATIC EXTRUSION OF TUBES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a press for hydrostatic extrusion of tubes.

2. The Prior Art Expanded

For hydrostatic extrusion a billet is inserted in a pressure chamber formed by a high-pressure cylinder, a die with an opening having the cross-section desired in the product manufactured, and a pressure-generating punch which, when inserted into the cylinder, generates the pressure necessary for the extrusion in a pressure medium surrounding the billet, thus influencing the billet from all sides. For extruding tubes a mandrel is required to shape the hollow in the tube. Equipment now in use for extruding tubes is shown and more fully described in U.S. patent application of Jan Nilsson et al; Ser. No. 145,184, filed May 20, 1971, now U.S. Pat. No. 3,751,958. In this extrusion equipment the forces exerted on the mandrel are taken up entirely inside the pressure chamber and transmitted to the die by a spacer tube. The pressure exerted on the inner end surface of the mandrel and which must be taken up by the spacer tube is extremely high and the wall of the spacer tube must therefore be strong. The pressure is $F = \pi d^2/4P$ if $d$ = the diameter of the mandrel and $P$ the pressure in the pressure chamber. This pressure is between 10 and 20 kbar. The equipment is operative and permits satisfactory charging of the pressure chamber. However, the spacer tube takes up space in the pressure chamber which, among other things, is uneconomical.

For pure hydrostatic extrusion, that is, extrusion without any axial force apart from the liquid pressure operating directly on the billet, tubular pressure-generating punches have not been successful so far. Internal overpressure causes the punch to snap while external over-pressure causes it to be compressed.

SUMMARY OF THE INVENTION

The press according to the invention is characterised in that it includes a rod passing through the pressure-generating punch forming a mandrel or constituting a holder for a mandrel. The rod is normally directly connected to a piston in a separate operating cylinder for axial operation of the rod during insertion of a billet. Between the rod and the hollow in the pressure-generating punch and between the pressure-generating punch and the high-pressure cylinder are seals which are located in approximately the same radial plane at the time when extrusion is taking place. The seals are generally located during the actual extrusion in a radial plane close to the end of the high-pressure cylinder and thus are stationary with respect to the cylinder.

BRIEF DESCRIPTION OF THE DRAWINGS

The invention is further described with reference to the accompanying drawings which show the press at five stages during an extrusion cycle.

DESCRIPTION OF THE PREFERRED EMBODIMENTS

Figure 1:
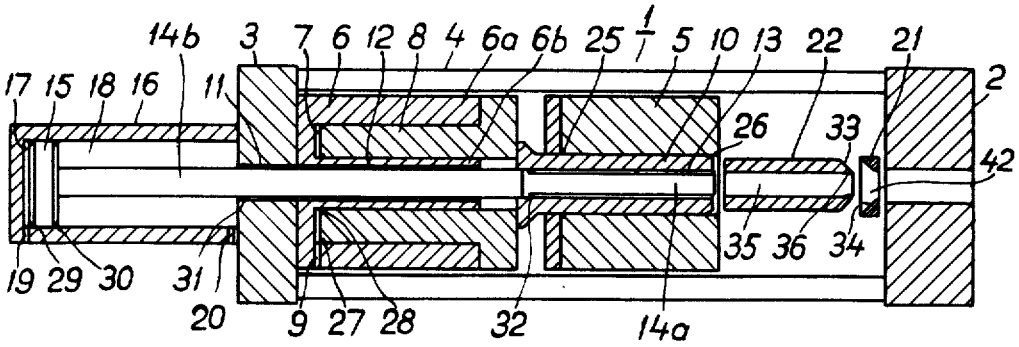
FIG. 1 shows the insertion of a billet opposite the die and the pressure-chamber cylinder, FIG. 2 the closing of the pressure chamber, FIG. 3 a recently closed pressure chamber, FIG. 4 the process just before extrusion is discontinued, and FIG. 5 the opened pressure chamber after extrusion is complete.
Figure 2:
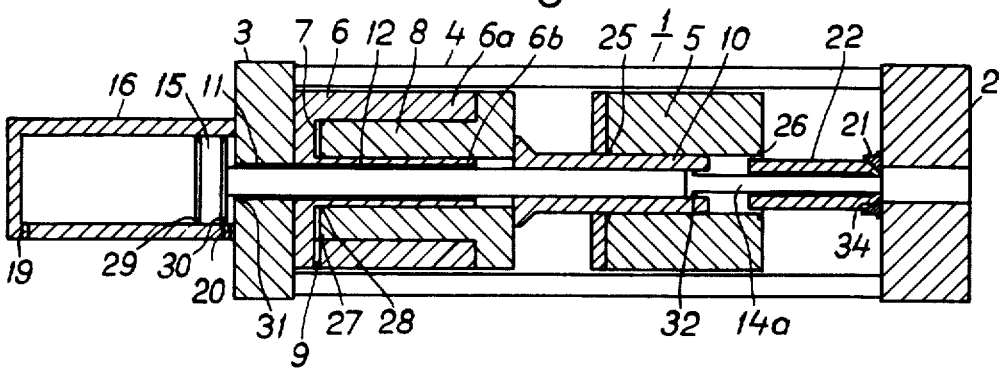

In the drawings 1 designates a horizontal press stand consisting of two yokes 2 and 3 connected to each other by a number of rods 4. A high-pressure cylinder 5 is axially movable in the press stand and can be displaced by means of a number of operating cylinders, not shown. There is also an operating cylinder 6 in the stand, which is attached to yoke 3. The operating cylinder is constructed of two concentric tubular parts 6a and 6b which form an annular space 7. In the operating cylinder is an annular piston 8. Pressure medium is supplied to the space 7 through a channel 9. The pressure-medium source is not shown. Return cylinders to move the piston 8 to the left of the position shown in FIGS. 1, 2, 3 and 5 are not shown. The piston 8 is connected to a tubular pressure-generating punch 10. A rod 14 passes through the hole 11 in the yoke 3 and the hole 12 in the part 6b and the hole 13 in the punch 10, the front part of said rod forming a mandrel 14a and the part 14b forming a holder for the mandrel 14a. The mandrel holder 14b is connected to a piston 15 slidable in a cylinder 16 attached to the yoke 3. The spaces 17 and 18 on each side of the piston 15 are in communication with pressure-medium sources, not shown, through channels 19 and 20 provided with valves. Near the yoke 2 is a die 21. The yoke 2 constitutes the die support during an extrusion process. A billet is designated at 22. Seals 25 and 26 are provided in the high-pressure cylinder to seal between the cylinder 5 and the pressure-generating punch 10 and between the cylinder 5 and the die 21. The piston 8 is provided with seals 27 and 28 to seal between itself and the cylinder sections 6a and 6b. The piston 15 is provided with seals 29 and 30 which seal between the piston and the cylinder 16. In the opening 11 in the yoke 3 is a seal 31 which seals between the yoke and the rod 14b. The mandrel 14a is provided with a seal 32 which seals between the mandrel and the pressure-generating punch 10. The billet 22 is provided at the front with a cone 33 which fits the inlet cone 34 of the die. The hole 35 in the billet 22 has a smaller diameter at the point 36 of the billet than the diameter of the mandrel 14a.

At the start of an operating cycle the parts of the press are in the positions shown in FIG. 1. With the help of manipulating devices, not shown, a billet 22 and a die 21 are applied between the yoke 2 and the cylinder 5 so that their center lines coincide with that of the high-pressure cylinder. The billet and the die are therefore placed opposite the hole 13 in the high-pressure cylinder 5. The space 17 in the operating cylinder 16 is supplied with pressure medium so that the piston 15 will displace the holder 14b and the mandrel 14a to the right. When the mandrel 14a reaches the point 36 of the billet, where the hole 35 has a smaller diameter than that of the mandrel, the mandrel 14a moves the billet towards the die 21 and then the billet and the die against the yoke 3 which mandrel as a die support. The force with which the mandrel presses the billet against the die 21 and thus against the yoke 3 is primarily determined by the grip between the billet and the mandrel at the point 36 of the billet. If the grip is suitably selected, the billet can be kept in the position shown in FIG. 2 and the manipulating devices removed. The cylinder 5 can then be pushed in over the billet and the die to the position shown in FIG. 3. The pressure chamber 40 is now completely closed and the billet abuts the mandrel 14a and the die 21. The pressure chamber 40 is filled with oil. In this position the seals 25 and 32 are in the same plane. The space 7 in the cylinder 6 is now supplied with pressure medium so that the piston 8 is displaced to the right and the pressure-generating punch 10 is pressed into the pressure chamber 40, thus increasing the pressure therein. When the pressure has increased to a certain level, the extrusion starts. A tube 41 is formed in the gap between the mandrel and the opening 42 in the die. When the units in the press are in the position shown in FIG. 4 the extrusion is discontinued. The piston 8 and punch 10 are returned to the left to their initial positions. The mandrel 14a is returned a little way to the left as shown in FIG. 5, after which the tube 42 is cut and the remnants 43 of the billet and the die 21 are removed. When the mandrel is drawn to the left to the position shown in FIG. 1, the billet remnants 43 are pressed against the end surface of the pressure-generating punch 10, the mandrel 14a is removed from the billet remnants and an operating cycle is completed and the next can be started.

Figure 3:
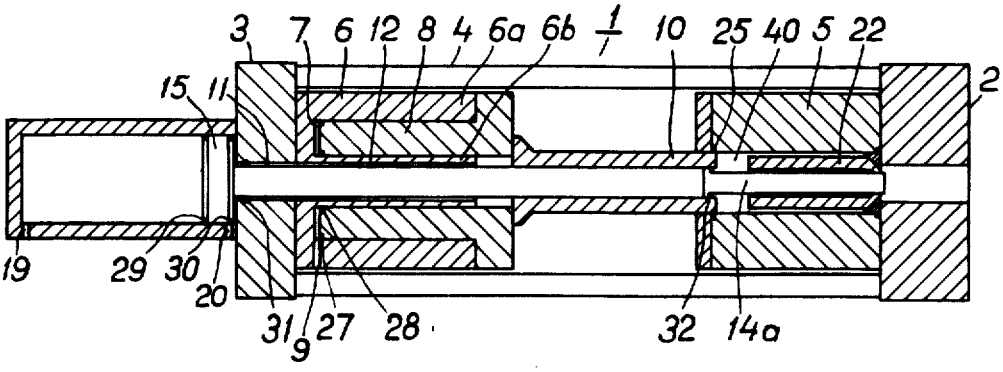
Figure 4:
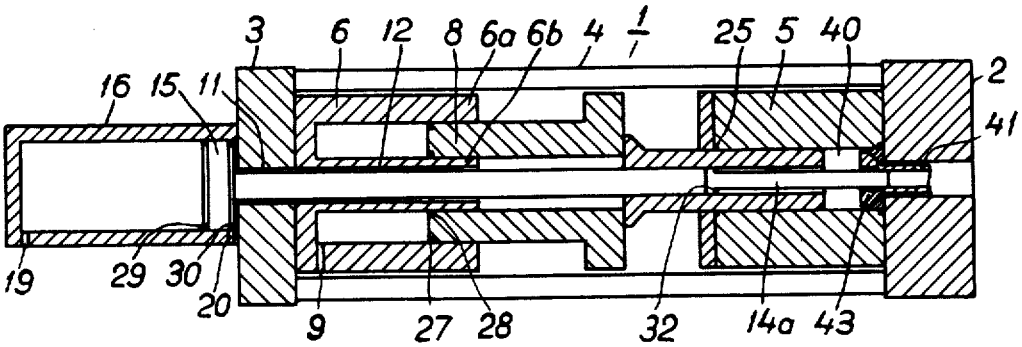
Figure 5:
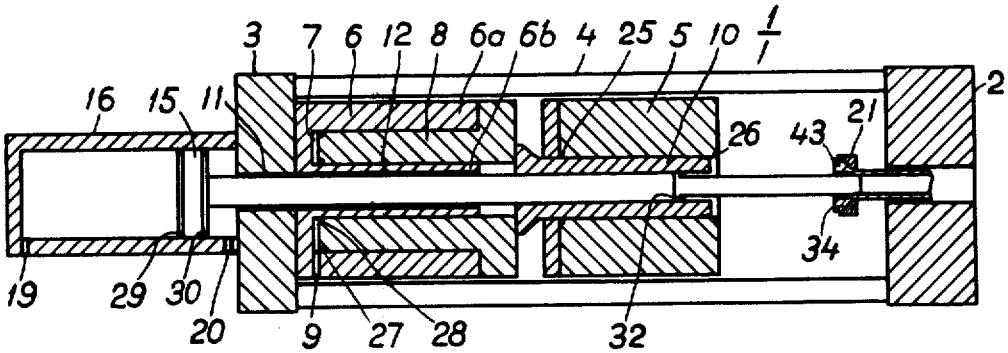

It will be noted that, in the position of FIGS. 3 and 4, that is, during the actual extrusion, the seals 25 and 32 between the pressure-generating punch and the high pressure cylinder and mandrel respectively are located in the same transverse plane, and that the axial distance therebetween is less than the radial distance.

I claim:

1. Press for hydrostatic extrusion of tubes, comprising a press stand, a pressure chamber constituted by a high-pressure cylinder axially displaceable in the press stand, a die insertable into the cylinder and a pressure-generating punch insertable into the cylinder to generate the pressure necessary for the extrusion process in a pressure medium enclosed in the pressure chamber, said pressure medium surrounding a billet to be extruded, a mandrel part which shapes the hole through the tube, which includes a rod part passing slidably through the pressure-generating punch, said mandrel part being supported by said rod part, a first seal *fixedly arranged at the end of the pressure chamber remote from the die* sealing between the high pressure cylinder and the pressure generating punch and a second seal sealing between the pressure generating punch and the mandrel, said second seal being *carried by said rod and* axially stationary in relation to the first seal during the extrusion period of an operating cycle and approximately in the same radial plane as said first seal.

2. Press according to claim 1, comprising an operating cylinder and an operating piston slidable in the operating cylinder operatively connected to the rod part.

3. Press according to claim 1, the axial distance between said seals being less than the radial distance between these seals when the rod part and the cylinder are fully advanced.

4. Press according to claim 1, the second seal being at substantially the same distance from the die end of the mandrel as the distance of the first seal from the die end of the pressure chamber.

* * * * *